United States Patent [19]
Lee et al.

[11] Patent Number: 5,961,819
[45] Date of Patent: Oct. 5, 1999

[54] TREATMENT OF SOUR HYDROCARBON DISTILLATE WITH CONTINUOUS RECAUSTICIZATION

[75] Inventors: Binh N. Lee, Humble; Michael W. Walther, Pearland, both of Tex.

[73] Assignee: Merichem Company, Houston, Tex.

[21] Appl. No.: 09/020,437

[22] Filed: Feb. 9, 1998

[51] Int. Cl.[6] .......................... C10G 19/02; C10G 19/00
[52] U.S. Cl. .................... 208/230; 208/203; 208/206; 208/226
[58] Field of Search .................... 208/203, 206, 208/226, 230, 209

[56] References Cited

U.S. PATENT DOCUMENTS

| | | | |
|---|---|---|---|
| 2,215,359 | 9/1940 | Livingston et al. | 196/13 |
| 3,585,005 | 6/1971 | Coggan | 26/267 |
| 3,839,487 | 10/1974 | Clonts | 260/683.48 |
| 3,923,645 | 12/1975 | Anderson, Jr. et al. | 208/206 |
| 3,977,829 | 8/1976 | Clonts | 23/267 |
| 3,989,466 | 11/1976 | Pan | 23/267 |
| 3,992,156 | 11/1976 | Clonts | 23/267 |
| 4,019,869 | 4/1977 | Morris | 23/288 |
| 4,039,389 | 8/1977 | Christman | 196/14.52 |
| 4,206,079 | 6/1980 | Frame | 252/428 |
| 4,213,877 | 7/1980 | Frame | 252/412 |
| 4,219,420 | 8/1980 | Muller | 210/82 |
| 4,364,821 | 12/1982 | O'Brien | 208/325 |
| 4,481,106 | 11/1984 | Verachtert | 208/206 |
| 4,481,107 | 11/1984 | Urban | 208/206 |
| 4,490,246 | 12/1984 | Verachtert et al. | 208/206 |
| 4,491,565 | 1/1985 | Verachtert | 422/256 |
| 4,675,100 | 6/1987 | Maple et al. | 208/203 |
| 4,753,722 | 6/1988 | Le et al. | 208/207 |

*Primary Examiner*—Walter D. Griffin
*Assistant Examiner*—Tam M. Nguyen
*Attorney, Agent, or Firm*—Jenkens & Gilchrist, PC

[57] ABSTRACT

An improved process is described for removing mercaptan sulfur from sour hydrocarbon distillate streams comprising of treating a sour hydrocarbon distillate stream in two oxidation zones within a reaction vessel. The first treatment occurs in the presence of a fiber bundle and the subsequent treatment over a bed of supported oxidation catalyst. The improvement comprises continuously keeping the bed in contact with an aqueous alkali metal hydroxide to maintain the catalyst in a caustic-wetted state, without interrupting the operation of the process.

10 Claims, 2 Drawing Sheets

TREATMENT OF SOUR HYDROCARBON DISTILLATE WITH CONTINUOUS RECAUSTICIZATION

BACKGROUND OF THE INVENTION

The present invention is directed to the treatment of sour hydrocarbon distillate to remove mercaptan compounds by contacting the distillate with an alkaline solution. More particularly, this invention describes an improved apparatus and process comprising a first treatment of the sour hydrocarbon distillate in the presence of a fiber bundle and a second treatment over a bed of supported oxidation catalyst.

Processes relating to the treatment of sour distillate hydrocarbons are described in many patents. For instance U.S. Pat. Nos. 3,758,404, 3,977,829 and 3,992,156 describe mass transfer apparatus and processes involving the use of fiber bundles which are particularly suited for such processes. U.S. Pat. No. 4,675,100, which is hereby incorporated by reference herein for all purposes as if fully set forth, describes apparatus and process whereby a sour hydrocarbon distillate stream is treated in two oxidation zones within the same reaction vessel to oxidize mercaptans, comprising a first treatment in the presence of a fiber bundle and a subsequent treatment over a bed of supported oxidation catalyst. According to this process, hydrocarbon containing mercaptan compounds to be oxidized is contacted with an aqueous alkali metal hydroxide solution, an oxidizing agent, preferably air, and a soluble metal phthalocyanine catalyst while in contact with a bundle of elongated fibers contained in a conduit. Upon disengagement from the fiber bundle, the hydrocarbon and the aqueous alkali metal hydroxide solution separate by gravity in a separation zone of the vessel where the aqueous alkali metal hydroxide solution becomes a lower phase and the hydrocarbons containing the oxidized mercaptan compounds which remain as an upper oil phase. The separated hydrocarbon phase is then passed upwardly, through a packed catalyst bed, in annular arrangement about the conduit containing the bundle fibers. There, the remaining difficulty oxidizable mercaptan compounds are further oxidized in contact with a catalytic composite consisting of a metal phthalocyanine disposed on a carbon support. According to the aforementioned process fresh aqueous alkali metal hydroxide solution, also referred as caustic solution hereinafter, is fed at about the top end of the catalyst bed to flow in contact with and countercurrently with the hydrocarbon from the top end to the bottom end of the bed, in order to keep the bed causticized at all times.

However, in practice, it has been observed that this method of causticizing the bed is very ineffective and fails to adequately causticize the bed while the unit is in operation. Inability to continuously causticize the bed while in operation results in the depletion of the caustic reservoir that is initially put in the bed in a period of about one to four weeks by reacting with acidic impurities found in the hydrocarbon feeds. As a result, the process must be interrupted at frequent intervals in order to maintain the mercaptan oxidation efficiency of the catalyst bed. During these frequently required recausticization process interruptions, operators reverse the hydrocarbon flow to insure that the caustic solution flows downwardly through the carbon bed. Therefore, feeding fresh caustic at about the top end of the catalyst bed and in countercurrent flow to the hydrocarbon flowing through the bed, according to the teachings of the prior art, does not accomplish effective continuous causticization of the catalyst bed. On the other hand shutting down the process on short regular time intervals in order to treat the bed with caustic has a significant adverse effect on the economic efficiency of the overall process. In addition, unit interruptions increase the risk of introducing impurities in the process. It follows from the foregoing that an urgent need exists in developing a process that would eliminate the aforementioned problems that are associated with prior art processes.

SUMMARY OF THE INVENTION

The present invention eliminates these limitations of the prior art. Accordingly, continuous treatment of the catalyst bed with an alkaline solution is accomplished without having to interrupt the operation of the process. Generally, the present invention, renders possible the continuous and effective recausticization of the catalyst bed while the unit is in operation, by circulating an aqueous alkali metal hydroxide solution through the catalyst bed in concurrent flow with the hydrocarbon flowing through the bed. As a result, longer operational times are now possible without the need for interrupting the process for retreating the catalyst bed with a fresh alkali metal hydroxide solution. Continuous recausticization improves significantly the economic efficiency of the overall process and increases its effectiveness in treating sour hydrocarbon distillates containing high levels of mercaptans and acidic impurities. In addition to the practical and economic advantages flowing from not having to interrupt the process the risk of contaminating the bed with impurities introduced during these interruptions has also been eliminated. Moreover, rather unexpectedly, the treating performance of the bed is improved significantly with the presence of circulating alkaline solution in the bed.

This invention, therefore, relates to an improvement over the treating process employing the equipment and apparatus described in the above-mentioned patents. Referring now to FIG. 1 an embodiment of the invention is shown, whereby a sour hydrocarbon stream 18 containing mercaptan compounds is oxidized by contacting it with an oxidizing agent, preferably air 21, in the presence of an aqueous alkali metal hydroxide solution 56, and a soluble metal phthalocyanine catalyst while in contact with a bundle of elongated fibers 12 contained in a conduit 10. Upon disengagement from fiber bundle 12, both liquids are discharged into a separation zone 24 where the aqueous alkaline solution collects in lower portion 26 as it is heavier than, and immiscible in the hydrocarbon. The improvement of this invention involves then conducting the separated hydrocarbon through a packed catalyst bed C, usually in annular arrangement about conduit 10, where the remaining difficulty oxidizable mercaptan compounds are further oxidized in contact with a supported metal oxidation catalyst, preferably on a carbon support, while being contacted in concurrent flow with additional aqueous alkali metal hydroxide solution circulating through catalyst bed. According to the embodiment of the invention shown in FIG. 1, aqueous alkali metal hydroxide solution is introduced at about the bottom end of catalyst bed C, flows upwardly and in concurrent flow with the hydrocarbon through catalyst bed C. The aqueous alkali metal hydroxide accumulates at the top of the bed where it is separated from the hydrocarbon through the use of a liquid separator device such as chimney type trays 65 and is finally being recycled back to the bottom of the bed through the use of conventional pumping means 53. Other liquid separator devices may be used including an overflow weir.

In a second embodiment of the present invention, shown in FIG. 2, the separated hydrocarbon from the separation zone is first conducted upwards through an annular conduit 111 to the top of the catalyst bed where it is introduced into the bed through tray-means 165 placed at the top end of the catalyst bed. Conduit 111 separates conduit 110 containing the bundle fibers 112 from the catalyst bed C and an adjacent second separation zone 127. The hydrocarbon is then passing through the catalyst bed in contact with and in concurrent, downward flow with additional aqueous alkali metal hydroxide solution. In this embodiment of the invention the aqueous alkali metal hydroxide solution is introduced into the bed through distributors means 116 at about the top end of bed C. It is then passing downwardly in concurrent flow with the hydrocarbon through the catalyst bed C. The aqueous alkali metal hydroxide is then separated from the hydrocarbon alkali mixture flowing out through screen 140 at the bottom end of bed C by gravity at the bottom phase 129 of separation zone 127. The aqueous alkali metal hydroxide is then recycled back to the top of the bed through conventional pumping means 155. Other variations of the present invention will become apparent to those having ordinary skill in the pertinent art from the following discussion.

DESCRIPTION OF THE PREFERRED EMBODIMENTS

Figure 1:
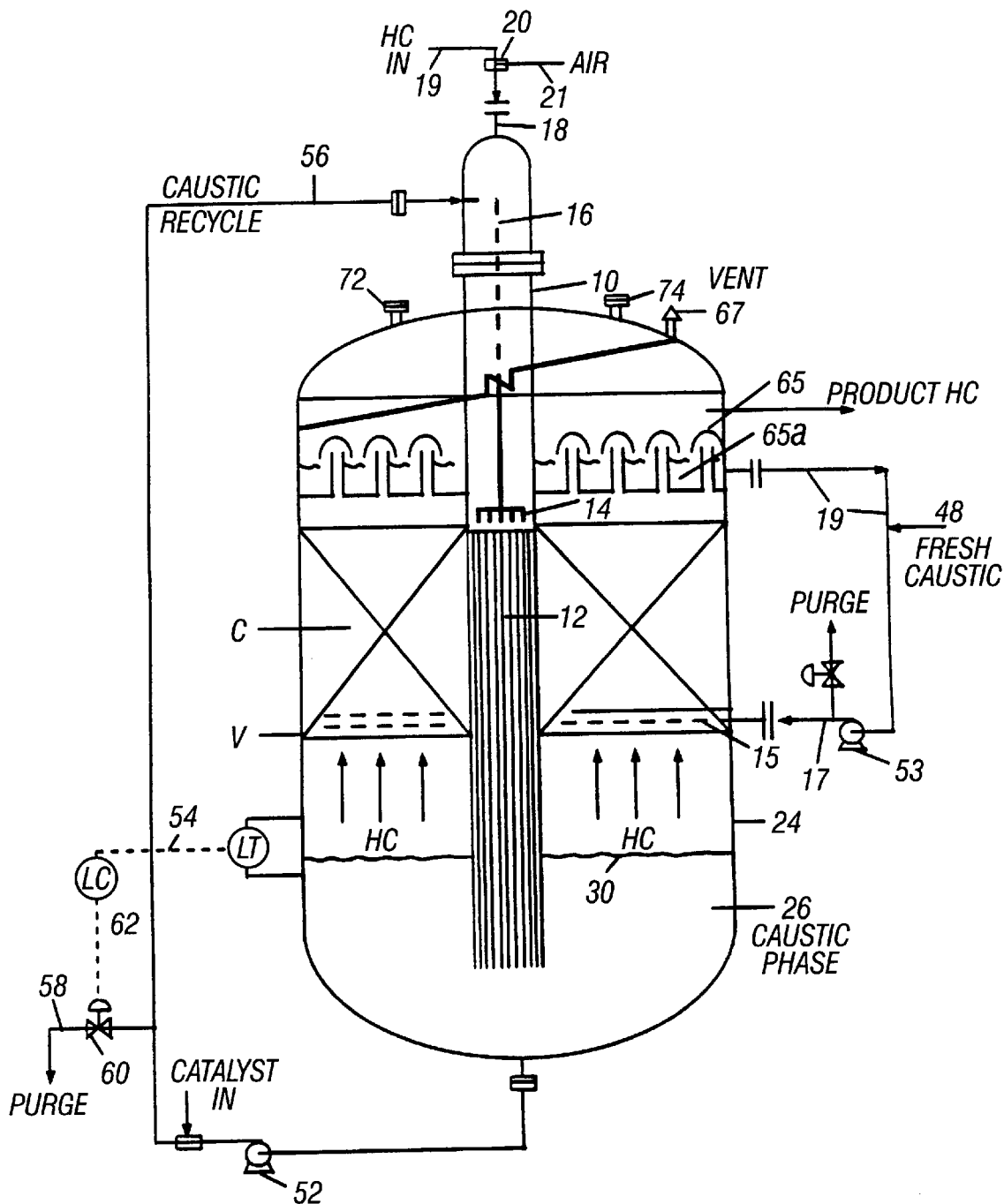
FIG. 1 shows, in schematic form, an embodiment of the apparatus used in the practice of this invention.

Referring now to the drawings, FIG. 1 shows an embodiment of improved apparatus and process whereby a sour hydrocarbon distillate stream 10 containing mercaptans is treated in a Vessel V having two oxidation zones. The first oxidation zone comprises of fibers 12 within a conduit 10. The second oxidation zone comprises a catalyst bed C which is in annular arrangement about conduit 10 in Vessel V. The improvement comprises of circulating an alkaline solution through catalyst bed C during the regular operation of the process, by introducing the alkaline solution through distributor grid 15 from line 17, concurrently with hydrocarbon flowing upwardly through catalyst bed C. Particularly, in a preferred embodiment, conduit 10 having in it a bundle of elongated fibers 12, preferably metallic fibers, is secured in conduit 10 for a portion of its length. These fibers 12 are secured at the upstream end in conduit 10, and fed through dispensing means, or distribution grid 14 with aqueous alkali metal hydroxide from tube 16. The hydrocarbon distillate to be treated enters through line 18 fed by charge stock from line 19 which is mixed with oxygen, preferably in form of air, through sparger 20 from intake line 21. Sufficient oxygen will normally be dissolved to oxidize all mercaptans in the hydrocarbon. At the downstream end of conduit 10 there is a gravity separator 24 into which the downstream end of the fibers 12 extend. This separator 24 is preferably integrated with Vessel V enclosing conduit 10.

In operation of the apparatus of FIG. 1, an aqueous alkali metal hydroxide, or caustic, solution is introduced through the tube 16 and distribution means 14 onto the fibers 12. A sour hydrocarbon stream, such as a hydrocarbon distillate, containing mercaptans alone or mercaptans and acidic impurities is introduced into conduit 10 through inlet pipe 18. Fibers 12 will be wetted by the aqueous caustic solution in preference to the hydrocarbon mixture. The aqueous caustic solution will form a film on fibers 12 which will be dragged downstream through conduit 10 by passage of hydrocarbon distillate through same conduit. Both liquids will be discharged into separation zone 26 of the separator 24. The volume of the hydrocarbon will be greater because the aqueous caustic passes through the system at a lower volumetric flow rate than the hydrocarbon. During the relative movement of the hydrocarbon with respect to the aqueous caustic film on the fibers, a new interfacial boundary between the hydrocarbon distillate and the aqueous caustic solution is continuously being formed, and as a result fresh aqueous caustic solution is brought in contact with this surface and allowed to react with the mercaptans in the hydrocarbon. While in contact with fiber bundle 12, acidic impurities commonly found in a hydrocarbon charge stock, phenolics, naphthenic acid and other organic acids are removed from the hydrocarbon distillate.

In separation zone 26, the aqueous caustic solution will collect in the lower portion of the separation vessel. The interface 30 within separator vessel 24 is normally kept at a level above the bottom of the downstream end of fibers 12 so that the aqueous caustic film can be collected directly in the bottom of separator 24 without it being dispersed into the hydrocarbon. Most of the phenolate or naphthenate impurities which often cause plugging in a packed bed are thus removed from the hydrocarbon in the aqueous phase. Not only does this increase oxidation efficiency, but reduces maintenance costs as well. However, some impurities remain in the hydrocarbon making it necessary to further treat the hydrocarbon with caustic solution in the catalyst bed oxidation zone.

Processes disclosing the use of fiber bundles in the treatment of sour hydrocarbon distillates are described in U.S. Pat. Nos. 3,758,404, 3,977,829 and 3,992,156 and are incorporated herein by reference for all purposes of patent practice. Conduit 10 and fiber bundle 12 enclosed therein are designed and sized, to have a length and diameter to preferably allow a 10 centimeter per second flow rate and approximately a 1 minute residence time for contact. The aforementioned parameters are preferred and the speed at which the liquids proceed from one end to the other of bundle 12 can preferably vary from about 2 to about 20 centimeters per second and the residence time from about 30 seconds to about 5 minutes. Longer residence times in contact with the fiber bundle would cause conduit 10 and fibers 12 to be of an inordinate length but, because of this invention such lengthy fiber bundles are unnecessary.

Concurrently with the introduction of the hydrocarbon having an oxygen-containing gas, preferably air, dissolved therein, there is introduced through distribution grid 14 from line 16 an aqueous alkali metal hydroxide, preferably sodium hydroxide, having a concentration of from about 5% to about 50% by weight alkali hydroxide with about 10% to 20% by weight alkali hydroxide being preferred. The amount of aqueous alkali metal hydroxide introduced through distribution grid 14 is such that the volumetric ratio of hydrocarbon distillate to aqueous caustic is from about 2:1 to about 20:1 with the ratio of from 3:1 to about 7:1 being preferred and about 5:1 being especially preferred. In addition the alkali metal hydroxide solution also includes an oxidation catalyst, the most prevalent and well known catalyst being a soluble phthalocyanine catalyst.

The phthalocyanine catalyst is both very active and highly stable. Because of its high activity, the catalyst is used in small concentrations. These may range from 5 to 500 and preferably 10 to 100 parts per million by weight of the alkaline solution, although lower or higher concentrations may be used in some cases. The use of higher concentrations are unnecessary in most cases but may be used if desired. Because of its high stability, the catalyst is used for long periods of time.

The alkaline solution is passing upwardly through the catalyst bed C in contact and in concurrent flow with the hydrocarbon. At the upper end of the bed the aqueous alkali metal hydroxide is separated from the hydrocarbon through the use of a conventional liquid separator device such as chimney type trays 65. It is understood, however, that many different types of liquid separators can be used such as for instance an overflow weir. The aqueous alkali metal hydroxide is collected at the bottom phase of the liquid accumulating on the trays since it is heavier. The accumulated aqueous metal hydroxide solution is then recycled back into the bottom of the catalyst bed through lines 19 and 17 using conventional pump 53. The use of a means to separate the aqueous alkali metal hydroxide from the hydrocarbon at generally the top of the carbon bed is critical to the operation of the process of the present invention. Lack thereof would result in formation of an emulsion at the top of the bed as hydrocarbon in the form of small bubbles would come through a layer of caustic accumulated on top of the bed. However, it should be understood that the invention is not limited to the use of overflow weir type distributors and that many other well known distributors could be used to separate the caustic from the hydrocarbon and at the same time minimize emulsion formation and foaming. Foaming could alternatively be reduced by controlling the napthenic acid spending level in the caustic solution.

Any suitable alkali metal hydroxide solution can be utilized in the process and comprises particularly sodium hydroxide (caustic), potassium hydroxide, etc. The alkaline solution generally is utilized as an aqueous solution of from about 5% to about 50% by weight concentration, more preferably about 10% to 20% by weight concentration. When desired, solutizers, solubilizing agents, and the like are employed including, for example, alcohols, particularly methanol or ethanol, phenols, cresols, butyric acid, naphthenic acid and so forth, in order to increase the contact and/or reaction of the sulfur compounds with the alkaline reagent. In some cases the hydrocarbon distillate contains solutizing agents in sufficient concentration to serve this purpose; otherwise they may be introduced from an extraneous source.

Any suitable phthalocyanine catalyst meeting the requirement of high activity and stability during use may be employed in the present invention. Particularly preferred metal phthalocyanines comprise cobalt phthalocyanine and vanadium phthalocyanine. The metal phthalocyanine in general, is not readily soluble in aqueous solutions and therefore, for improved operation is preferably utilized as a derivative thereof. Particularly preferred derivatives are the sulfonated and carboxylated derivatives, and more particularly the disulfonated derivatives. Thus, a preferred phthalocyanine catalyst comprises cobalt phthalocyanine disulfonate. Another preferred catalyst comprises vanadium phthalocyanine disulfonate.

The aqueous caustic separates from the partially treated hydrocarbon in separation zone 26 with the aqueous caustic collecting at the bottom of the vessel with the partially treated hydrocarbon at the top of separator 24 as the top layer outside of conduit 10 containing fibers 12 where the hydrocarbon becomes disengaged from fibers 12. In annular arrangement about conduit 10 in Vessel V is a catalyst bed C.

In addition to the oxidation catalyst dispersed in the alkali metal hydroxide solution, an oxidation catalyst, preferably a similar phthalocyanine catalyst, is composited with a suitable support. The support should be insoluble in, or substantially unaffected by the caustic solution and hydrocarbons under the conditions prevailing in this subsequent treating zone 38 of catalyst bed C. Activated carbon is particularly preferred because of its high adsorptivity and stability under these conditions. Other carbon carriers include coke, charcoal which may be obtained from any suitable source including bone char, wood charcoal, charcoal made from cocoa-nut or other nut shells, fruit pits, etc. The choice of the support will be made with reference to its adsorptive or spacing properties and its stability in the alkaline reagent solution and hydrocarbons at the conditions prevailing in the treating zone.

The composite of phthalocyanine and support may be prepared in any suitable manner. In one method the support may be formed into particles of uniform or irregular size and shape, including spheres, prills, pellets, rings, saddles, flakes, etc. and then is intimately contacted with the solution of the phthalocyanine catalyst. An aqueous or alkaline solution of the phthalocyanine catalyst is prepared and, in a preferred embodiment, the support particles are soaked, dipped, suspended, or immersed in the solution. In another method, the solution may be sprayed onto, poured over or otherwise contacted with the support. Excess solution may be removed in any suitable manner, and the support containing the catalyst allowed to dry at room temperature, in an oven, or by means of hot gases passed there over, or in any other suitable manner.

The composition of the catalyst bed is described in U.S. Pat. No. 4,675,100 incorporated herein by reference for all purposes of patent practice. Generally, it is preferred to deposit as much catalyst with the support as will form a stable composite although a lesser amount may be so deposited, if desired. In a typical preparation, 1% by weight, of cobalt phthalocyanine sulfonate is composited with activated carbon by soaking granules of the carbon in a solution of the phthalocyanine catalyst. In another method, the carrier may be deposited in Vessel V to form bed C and the phthalocyanine catalyst solution passed therethrough with subsequent drying in order to form the catalyst composite in situ. If desired, the solution may be recycled one or more times in order to prepare the desired composite. In still another embodiment the carrier may be placed in Vessel V and Vessel V filled with a solution of the catalyst, thereby forming the composite in situ.

The hydrocarbon passes through catalyst bed C which is designed to have a diameter and length to allow a residence time of from about 5 minutes to about 60 minutes with the preferable residence time being about 15 to about 25 minutes, most preferably about 20 minutes. A catalyst bed C is supported by a restrainer means such as a screen 40 in Vessel V. As the hydrocarbon being treated is disengaged from fibers 12 and moves up through catalyst bed C it is contacted in concurrent flow by fresh alkali metal hydroxide in the treating zone 38 being introduced into bed C through distributors 15 placed within catalyst bed C.

The aqueous caustic solution accumulated into separator 24 exits separation zone 26 through line 50 to pump 52 where it is moved to line 54 to be recirculated for reuse through line 56 and through line 16 through distributors 14 on to bundle 12. Impurities are removed from the aqueous caustic stream by a bleed stream line 54 through lines 58 and valve 60 which operates in response to an interphase level controller 62 monitoring the aqueous liquid level of separation zone 26 and removes excess liquid in response to signals from level controller 62. The product hydrocarbon containing organic disulfides oxidation products is removed from catalyst bed C and reaction vessel V product line 64 from collection means 66, which can be any collection means well known in the art. Excess oxidant gas is vented from the hydrocarbon distillate product through an appropriate vent 67. This vent is shown on vessel V but it is to be understood that it could be from a separately located flash tank. Also shown on FIG. 1 are access flanges 68 and 70 which are used for maintenance of vessel V and nozzles 72 and 74 arbitrarily placed in a convenient location for the charging of catalyst to the vessel V.

Figure 2:
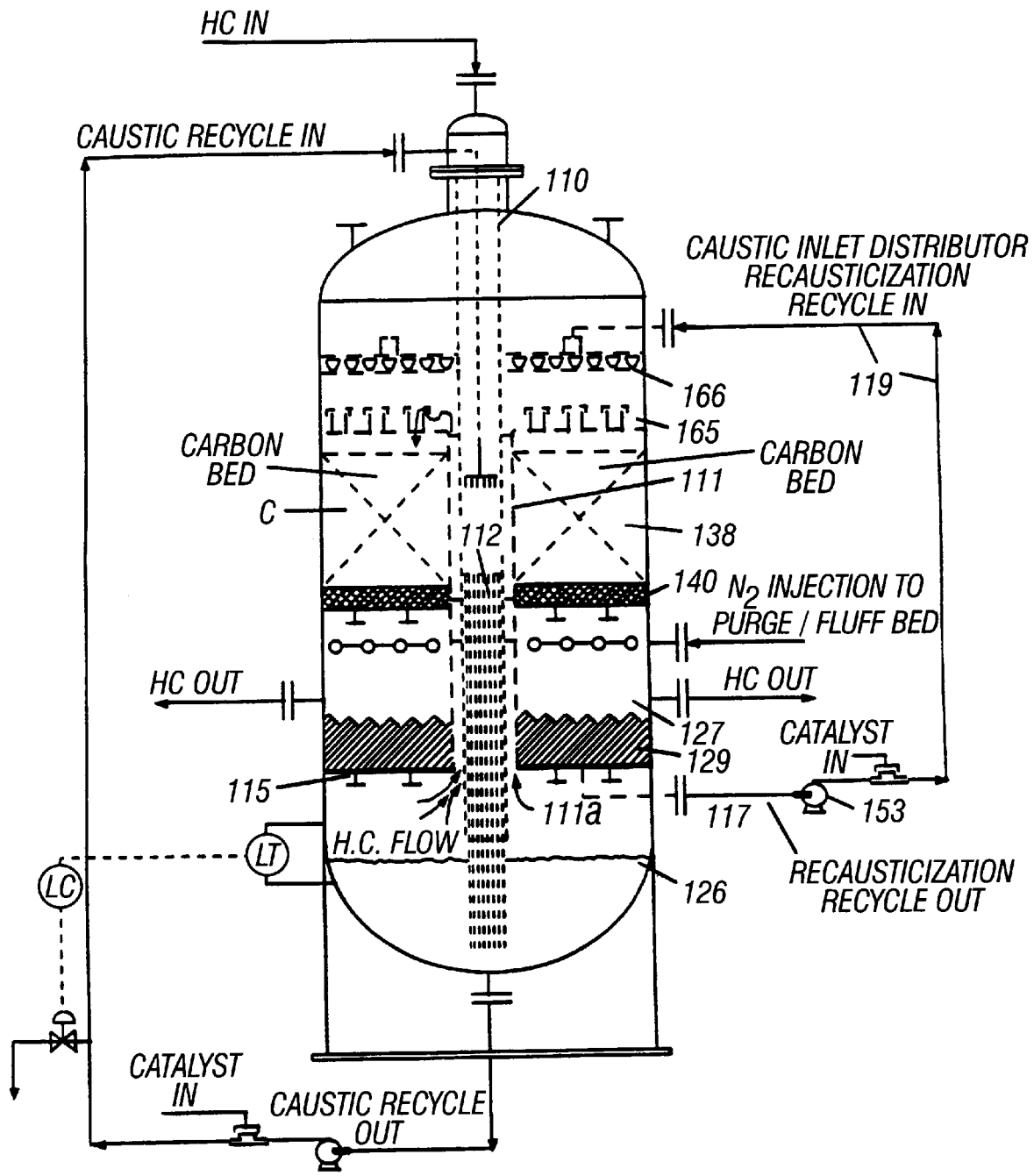
FIG. 2 shows, in schematic form, another embodiment of the apparatus used in the practice of this invention.

Referring now to FIG. 2, a second embodiment of the invention is shown. FIG. 2 is a simplified schematic of apparatus and process whereby hydrocarbon from separation zone 126 flows upwards through an annular conduit 111 separating conduit 110 and catalyst bed 138. At the bottom of the bed and in fluid communication with it lies a second separation zone 127 which extends along the bottom portion of conduit 111. Restrainer means 115 at the bottom of separation zone 127 separate first separation zone 124 and second separation zone 127. Annular conduit 111 is in fluid communication with separation zone 126 at its bottom end 111a and with the top of catalyst bed 138 at its top end 111b through chimney type trays 165. Conduit 111 is designed and sized, to have an annular space area equal to area required to allow a hydrocarbon velocity of from about 0.1 feet per second to about 4 feet per second, preferably from about 0.4 feet per second to about 2.5 feet per second and most preferably from about 0.9 feet per second to about 1.1 feet per second. The length of the conduit 111 is dictated by the length of the catalyst bed 138 and the second separation zone 127. The catalyst bed 138 is supported by screen means 140 that allow fluid communication with separation zone 127.

In operation, separated hydrocarbon from first separation zone 126 is first conducted upwards through conduit 111 to the top of the bed where it is directed to the bed through tray-means 165 placed at the top end of the catalyst bed. The hydrocarbon is then passing through the catalyst bed in a downward flow, while being contacted with additional aqueous alkali metal hydroxide solution flowing concurrently through the catalyst bed. In this embodiment of the invention the aqueous alkali metal hydroxide solution is introduced into the bed through distributors means 166 located at about above the top end of bed 138 and trays 165. It is then moving through trays 165 downwardly and in concurrent flow with the hydrocarbon through the catalyst bed 138. The aqueous alkali metal hydroxide is then separated from the hydrocarbon alkali mixture flowing out through screen 140 at the bottom end of bed 138 by gravity at the bottom phase 129 of separation zone 127. The aqueous alkali metal hydroxide is then recycled back to the top of the bed through lines 117 and 119 by the use of conventional pump 155.

The aqueous caustic passes through the system at a lower volumetric flow rate than the hydrocarbon. During the relative movement of the hydrocarbon with respect to the aqueous caustic a new interfacial boundary between the hydrocarbon distillate and aqueous alkaline caustic solution is continuously being formed, and as a result fresh aqueous caustic solution is brought in contact with the surface and allowed to react with the mercaptans in the hydrocarbon. While in contact with the catalyst bed any acidic impurities that made it through the fiber bundle are removed from the hydrocarbon distillate. The product hydrocarbon is collected from the upper portion of separation zone 127.

From the foregoing description of the preferred embodiments of this invention those skilled in the art to which the invention pertains may make many obvious changes and modifications without departing from the scope of the invention.

What is claimed is:

1. In a process of oxidizing mercaptan compounds contained in hydrocarbon distillates, including the steps of contacting the distillate in the presence of a fiber bundle with a gaseous oxidant and a first aqueous alkali metal hydroxide solution containing an oxidation catalyst to oxidize at least a portion of the mercaptan compounds in the hydrocarbon distillate; separating the alkali metal hydroxide from the treated hydrocarbon distillate; disengaging the hydrocarbon distillate and oxidant gas from the fiber bundle; and contacting the hydrocarbon distillate and oxidant gas with a bed of supported oxidation catalyst the improvement comprising:

introducing a second stream of aqueous alkali metal hydroxide solution into the catalyst bed, having a content of from about 5 wt% to about 50 wt% of an alkali metal hydroxide in concurrent flow with and in contact with said treated hydrocarbon distillate through the catalyst bed;

separating said second aqueous alkali metal hydroxide solution from the treated hydrocarbon distillate; and recovering the product hydrocarbon distillate from such catalyst zone.

2. The process of claim 1 wherein the supported oxidation catalyst is a metal phthalocyanine supported on a carbon.

3. The process of claim 1 wherein the catalyst is cobalt phthalocyanine disulfonate.

4. The process of claim 3 wherein the support is an activated carbon.

5. The process of claim 1 wherein the second aqueous metal hydroxide solution is introduced into the bottom of the bed and is separated from the hydrocarbon product through the use of chimney trays located at about the top end of the catalyst bed.

6. The process of claim 1 including recovering the second aqueous metal hydroxide solution from the catalyst bed and recycling to the catalyst bed.

7. The process of claim 1 wherein the alkali metal hydroxide is sodium hydroxide in a concentration from about 2% to about 10% by weight and the residence time is from about 1 to 70 minutes.

8. An improved process for oxidizing mercaptan compounds from sour hydrocarbon distillate comprising the steps of:

contacting said hydrocarbon distillate in the presence of a fiber bundle with a gaseous oxidant and a first aqueous alkali metal hydroxide solution having an oxidation catalyst therein at a temperature and pressure and for a period of time sufficient to oxidize at least a portion of said mercaptan compounds;

separating said first aqueous alkali metal hydroxide solution from the treated hydrocarbon distillate;

passing said treated hydrocarbon distillate and oxidant gas from said separator through a bed of supported oxidation catalyst;

introducing a second alkali metal hydroxide solution into said bed of supported oxidation catalyst;

passing said second aqueous alkali metal hydroxide solution concurrently with said treated hydrocarbon distillate through the bed of supported oxidation catalyst;

separating said second aqueous alkali metal hydroxide solution to the bed through pumping means; and recovering the product hydrocarbon distillate exiting from such catalyst zone.

9. In an improved process for removing mercaptans from a sour hydrocarbon distillate comprising the steps of contacting the hydrocarbon distillate in the presence of a fiber bundle with an oxidant and a first aqueous alkali metal hydroxide solution; and subsequently passing the treated hydrocarbon distillate through a bed of supported oxidation catalyst, the improvement which comprises:

circulating a second aqueous alkali metal hydroxide solution through the catalyst bed in contact with and in concurrent flow with the treated hydrocarbon distillate, without interrupting the operation of the process.

10. An improved process for oxidizing mercaptan compounds from sour hydrocarbon distillate, comprising the steps of:

contacting said hydrocarbon distillate in the presence of a fiber bundle contained in a first conduit with a gaseous oxidant and a first aqueous alkali metal hydroxide solution having an oxidation catalyst therein at a temperature and pressure and for a period of time sufficient to oxidize at least a portion of said mercaptan compounds;

separating said first aqueous alkali metal hydroxide solution from the treated hydrocarbon distillate in a first separation zone;

passing said treated hydrocarbon distillate and oxidant gas through an annular conduit separating first conduit and the catalyst bed, to the top of the catalyst bed;

introducing a second stream of aqueous alkali metal hydroxide solution into said catalyst bed at about the top of the bed;

flowing said second aqueous alkali metal hydroxide solution downwardly through the catalyst bed concurrently with the hydrocarbon distillate;

separating said second aqueous alkali metal hydroxide solution in a second separation zone;

recycling recovered second aqueous alkali metal hydroxide solution to the top of the bed through pumping means; and recovering the product hydrocarbon distillate from the second separation zone.

* * * * *